W. M. GRISCOM.
MANUFACTURE OF KEYS.

No. 172,729. Patented Jan. 25, 1876.

Witnesses,
Harry Howson Jr
Harry Smith

William M. Griscom
by his Attorneys
Howson and Son

UNITED STATES PATENT OFFICE.

WILLIAM M. GRISCOM, OF READING, PENNSYLVANIA.

IMPROVEMENT IN THE MANUFACTURE OF KEYS.

Specification forming part of Letters Patent No. 172,729, dated January 25, 1876; application filed January 5, 1876.

*To all whom it may concern:*

Be it known that I, WILLIAM M. GRISCOM, of Reading, Pennsylvania, have invented an Improved Key, and mode of manufacturing the same, of which the following is a specification:

The object of my invention, which is a cheap plan of manufacturing substantial keys of rolled or struck-up metal of one solid piece, I accomplish in the following manner, reference being had to the accompanying drawing, in which—

Figure 1:
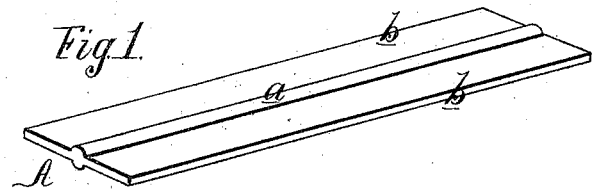
Figure 2:
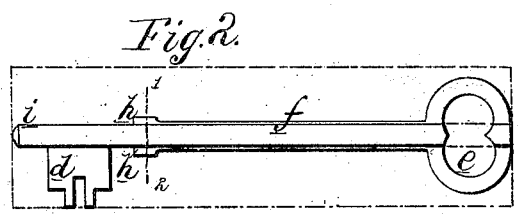
Figure 3:
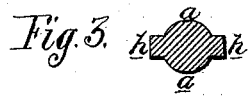

Figure 1 is a piece of a rolled or struck-up bar as it appears prior to its conversion into a key; Fig. 2, a view illustrating the key punched out from the bar, and Fig. 3 an enlarged transverse section on the line 1 2.

I first make a bar, A, of the form shown in Fig. 1, and cut it to any desired length, the bar being a combination of a central cylindrical portion with webs *b b*—or, in other words, a flat bar with a central bead or rib, *a*, on each side. I use a die and punch, having cutting-edges of the desired form of the key, as indicated by the plain lines in Fig. 2, and, by placing the bar A on the die, and applying the punch under pressure, cut away the webs *b* to the extent which a comparison between the dotted and plain lines in the said Fig. 2 will indicate.

The key thus made will be ready for use after the rough edges have been removed and a polish, if required, imparted to it. The wards may be formed in the portion *d* of the key, either by the die and punch or afterward, as circumstances may suggest.

It will be observed that the bow *e* of the key is composed mainly of portions of the webs of the bar, the beads *a*, however, extending to the opening in the bow, and thus affording strength at the junction of the shank *f* with the said bow.

The dies and punch may be so formed as to cut away the webs of the bar to the beads *a* in that portion of the key which constitutes the shank *f*; but I prefer to make the said shank partly of the beads and partly of the webs, as shown in the drawing.

If a neat round shank is required, the narrow fins formed by portions of the webs may be removed by grinding or otherwise.

The pin *i* of the key is formed by cutting the webs as far as the beads, excepting where the "bit" *d* occurs, and this is composed of part of one of the webs. Two projections, *h h*, derived from the webs, form a substitute for the ordinary collar.

The bar A may be struck up by stamping-dies; but I prefer to roll it, as the most economical plan, and the bar may be made of steel, wrought-iron, or rolled brass, as required.

In place of the bar with a single web on each side, a plate with a number of beads or ribs on each side may be rolled for conversion into keys, the distance between the webs being such as the character of the keys and economy in the consumption of metal may suggest.

Figure 4:
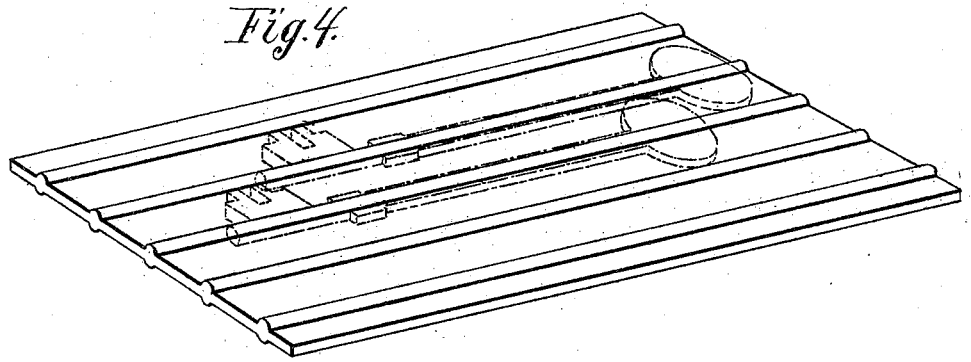

The plan shown by dotted lines in Fig. 4 may, for instance, be adopted in cutting out keys from a plate having a number of beads on each side.

I claim as my invention—

1. The method herein described of manufacturing keys—that is to say, first making a bar or plate composed of beads or ribs and webs, and then punching out the said bar, so as to produce a key composed partly of the webs and partly of the beads, as specified.

2. As a new article of manufacture, a key composed partly of the beads and partly of the webs *b b* of a rolled bar, A, as set forth.

In testimony whereof I have signed my name to this specification in the presence of two subscribing witnesses.

WILLIAM M. GRISCOM.

Witnesses:
S. W. DYER,
THOMAS C. LEINBACH.